United States Patent
Schoening et al.

(10) Patent No.: US 9,475,103 B2
(45) Date of Patent: Oct. 25, 2016

(54) DEVICE FOR CLEANING CONTAINER INTERIOR WALLS

(71) Applicant: Hammelmann Maschinenfabrik GmbH, Oelde (DE)

(72) Inventors: Paul Schoening, Beelen (DE); Michael Jarchau, Oelde (DE)

(73) Assignee: HAMMELMANN MASCHINENFABRIK GMBH, Oelde (DE)

( * ) Notice: Subject to any disclaimer, the term of this patent is extended or adjusted under 35 U.S.C. 154(b) by 528 days.

(21) Appl. No.: 13/946,764

(22) Filed: Jul. 19, 2013

(65) Prior Publication Data

US 2014/0020717 A1 Jan. 23, 2014

(30) Foreign Application Priority Data

Jul. 20, 2012 (DE) .................. 10 2012 106 608

(51) Int. Cl.
| | |
|---|---|
| B08B 9/00 | (2006.01) |
| B08B 9/093 | (2006.01) |
| B08B 9/08 | (2006.01) |
| B05B 13/06 | (2006.01) |
| B05B 3/04 | (2006.01) |
| B05B 3/16 | (2006.01) |
| B29C 51/02 | (2006.01) |
| B08B 9/043 | (2006.01) |

(52) U.S. Cl.
CPC ......... *B08B 9/0936* (2013.01); *B05B 13/0636* (2013.01); *B08B 9/0813* (2013.01); *B08B 9/093* (2013.01); *B05B 3/0418* (2013.01); *B05B 3/16* (2013.01); *B08B 9/0433* (2013.01); *B29C 51/02* (2013.01)

(58) Field of Classification Search
None
See application file for complete search history.

(56) References Cited

U.S. PATENT DOCUMENTS

| | | | |
|---|---|---|---|
| 3,379,379 | A | 4/1968 | Orem |
| 4,944,457 | A | 7/1990 | Brewer |
| 8,240,634 | B2 | 8/2012 | Jarchau et al. |
| 2009/0194717 | A1 | 8/2009 | Jarchau et al. |

FOREIGN PATENT DOCUMENTS

| | | |
|---|---|---|
| DE | 35 23 386 | 1/1987 |
| DE | 93 11 773 | 11/1993 |
| EP | 1 072 689 | 2/1986 |
| GB | 1188693 | 4/1970 |

OTHER PUBLICATIONS

European Search Report issued on Nov. 12, 2013 in EP 13 17 5729.
English translation of European Search Report issued on Nov. 12, 2013 in EP 13 17 5729.

*Primary Examiner* — Eric Golightly
(74) *Attorney, Agent, or Firm* — Henry M. Feiereisen LLC.

(57) ABSTRACT

A cleaning device for cleaning an interior wall of a container includes a rotatable driveshaft which is supported in a nozzle head mounted for rotation about an axis extending transversely to the driveshaft. A nozzle holder is mounted on the driveshaft has an arm for holding a nozzle for ejecting a liquid under pressure. The driveshaft and/or the nozzle head are reversibly pivotable via a gear mechanism, with an auxiliary drive connected to the gear mechanism for driving the nozzle holder.

9 Claims, 11 Drawing Sheets

$\alpha = 30° - 120°$

α=30°-120°

DEVICE FOR CLEANING CONTAINER INTERIOR WALLS

CROSS-REFERENCES TO RELATED APPLICATIONS

This application claims the priority of German Patent Application, Serial No. 10 2012 106 608.6 filed Jul. 20, 2012 pursuant to 35 U.S.C. 119(a)-(d), the disclosure of which is incorporated herein by reference.

BACKGROUND OF THE INVENTION

The invention refers to a cleaning device for cleaning interior walls of containers.

The following discussion of related art is provided to assist the reader in understanding the advantages of the invention, and is not to be construed as an admission that this related art is prior art to this invention.

Such cleaning devices are predominantly utilized in connection with removing or dissolving hardened deposits that occur at the interior surfaces of container walls of tanks or similar. In doing so, the nozzle head as well as the nozzle holder of the cleaning device are moved hydraulically by the liquid under pressure for removing the dirt accumulation, whereby the liquid is usually water pressurized up to a pressure of about 2000 bar. The nozzle holder and the nozzle head each are in rotation during the entire duration of the application.

DE 35 23 386 A1 discloses a cleaning device which includes a nozzle holder with two arms that each are provided with a nozzle from which expelled water jet hits deposit to be removed though the rotational motion of the nozzle head and the nozzle holder, whereby the jet is sprayed in vertical and horizontal direction. The nozzle holder as well as the nozzle head each are in rotation during the duration of the entire application. Due to this rotating motion, only a relatively small area is effectively sprayed with water for the dirt removal. Outside of this effective area, the removal force of the water remains unused. The degree of effective removal is also diminished because the liquid pressure has to be kept continually high in order to rotate the nozzle head and the nozzle holder, which makes for a low output of cleaning power. Accordingly, the energy input required to make the device effective is diametrically opposite to an optimization of the cleaning operation.

It would therefore be desirable and advantageous to provide an improved cleaning device which obviates prior art shortcomings and which can be operated reduced energy consumption and lower costs.

SUMMARY OF THE INVENTION

According to one aspect of the present invention a cleaning device for cleaning an interior wall of a container includes a rotatable driveshaft, a nozzle head supporting the driveshaft and mounted for rotation about an axis extending transversely to the driveshaft, a nozzle holder mounted on the driveshaft, at least one nozzle held in an arm of the nozzle holder for ejecting a liquid under pressure, a gear mechanism configured for reversibly pivoting at least one of the driveshaft and nozzle head, and an auxiliary drive connected to the gear mechanism for driving the nozzle holder.

According to another advantageous feature of the present invention, the gear mechanism can be configured in at least one of two ways, a first way in which the gear mechanism is constructed as a coupling gear including a first connecting rod having one end connected to a driven crank disc and another end connected by an articulated joint a coupling member to which a second connecting rod is connected, said second connecting rod being in operative connection with the driveshaft, a second way in which the gear mechanism includes a gear driven by a toothed gear drive to which a crank is connected to a coupling gear attached at a drive disc.

According to another aspect of the present invention, a cleaning device for removal of a deposit from a surface includes a nozzle head, a nozzle holder mounted on the nozzle head for rotation, at least one radial nozzle held in the nozzle holder for expelling liquid under pressure, and a recoil nozzle provided on the nozzle head at a side opposite to the nozzle holder for pressing the nozzle head at the surface.

Ina cleaning device according to the present invention, the motor shaft and thus the nozzle holder can be reversibly pivotable via a gear mechanism. Hereby, a pivot angle comes into play. Preferred is that the pivot angle is adjustable depending on the size and measurements of the container. A high efficiency in operating the cleaning device is realized when the pivot angle is less than 180°. Currently preferred is an angle in the range of between 30° and 120°.

While the pivot plane of the nozzle holder is oriented in vertical direction, through rotating the nozzle head, the nozzle holder is also moved in horizontal direction, so that the nozzle head may also be reversibly pivotable and also driven by gear mechanism.

This reversible pivoting motion of the nozzle head is preferable when, cleaning the interior wall of a container having a large diameter, where the cleaning device is correspondingly positioned far outside the center axis of the container. This pivoting motion of the nozzle head is also preferred at a pivot angle that is at a range of less than 180°; whereby the range of the pivot angle is freely selected corresponding to the job at hand and the optimization of the deposit removal.

It has surprisingly been shown that with a cleaning device according to the present invention, an increase in efficiency of more than 300% is realized. At identical output, this translates directly into corresponding energy savings. Moreover, the reduced cleaning time means that less downtime in utilization of the container and as a consequence reduces the operating cost.

According to the present invention, the gear mechanism for each, the reversible drive of the nozzle holder and the nozzle head is a coupling gear which is configured as a disc-coupling gear where a first crank disc is rotatably driven by a hydraulic drive, while a second crank disc carries out the reversible pivot motion and acts as the drive for the motor shaft, respectively the nozzle head. The second crank disk has a crank length that is larger than that of the rotating crank disc, wherein a connecting rod is positioned eccentrically and operatively connected to each of the crank discs and are connected to each other via a rigid coupling member. The coupling member is configured as a two armed lever whose rotation axis is adjustable so that the pivot angle of the motor drive and that of the nozzle head can be adjusted depending on demand.

To change the rotational speed of the nozzle head drive, a brake is provided, for example an eddy-current brake which is in functional correspondence with the central hydraulic drive.

For a constructive simplification, as compared to the prior art where the two nozzles in opposite alignment are set off relative to each other for producing a torque, in the cleaning device according to the present invention, the two nozzles are oriented oppositely aligned, whereby an auxiliary rotation drive supplied with water pressurized at a reduced energy level, drives the nozzle holder. It is also contemplated to drive the auxiliary drive by means of batteries, or by pneumatic means.

According to yet another aspect of the present invention, a method of removing a deposit from a surface includes the steps of removing deposit from a portion of the surface by a cleaning liquid, advantageously water, expelled under pressure from a nozzle arranged at a rotating nozzle holder supported in a nozzle head to produce a clean portion, pressing the nozzle head against the clean portion of the surface, and removing deposit neighboring the clean portion by radial nozzles arranged on a side of the nozzle holder and transversely to a rotational axis.

After complete removal of the deposit in a partial area of the surface, the nozzle head is pressed against the cleaned surface and the adjacent deposits are removed by means of the radial nozzles laterally disposed at the nozzle holder and perpendicular to the rotational axis.

The pressure which presses the nozzle head toward the cleaned surface is generated by a recoil nozzle, whose impact direction runs perpendicular to the cleaned surface. To support the nozzle head at the cleaned surface, an abutment is disposed at the nozzle arm, which preferably has a hemispherical shape thus representing a minimal engaging surface. The inclination of the radial nozzles relative to the surface can be varied and are adjustable depending on the thickness of the deposit to be removed.

To realize a complete removal of the deposit in a partial area of the surface and to thus create a support surface for the nozzle head, axial nozzles are provided that act in opposite manner to the recoil nozzles and rotate around the rotation axis of the nozzle arm and are disposed outside the support body. Preferred are two such axial nozzles.

The rotation of the nozzles arm is effected by the recoil forces of the cleaning liquid expelled from the radial nozzles that are laterally arranged in opposite direction relative to the rotational axis and set off relative to each other resulting in a torque that generates a rotational motion in the nozzle arm.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
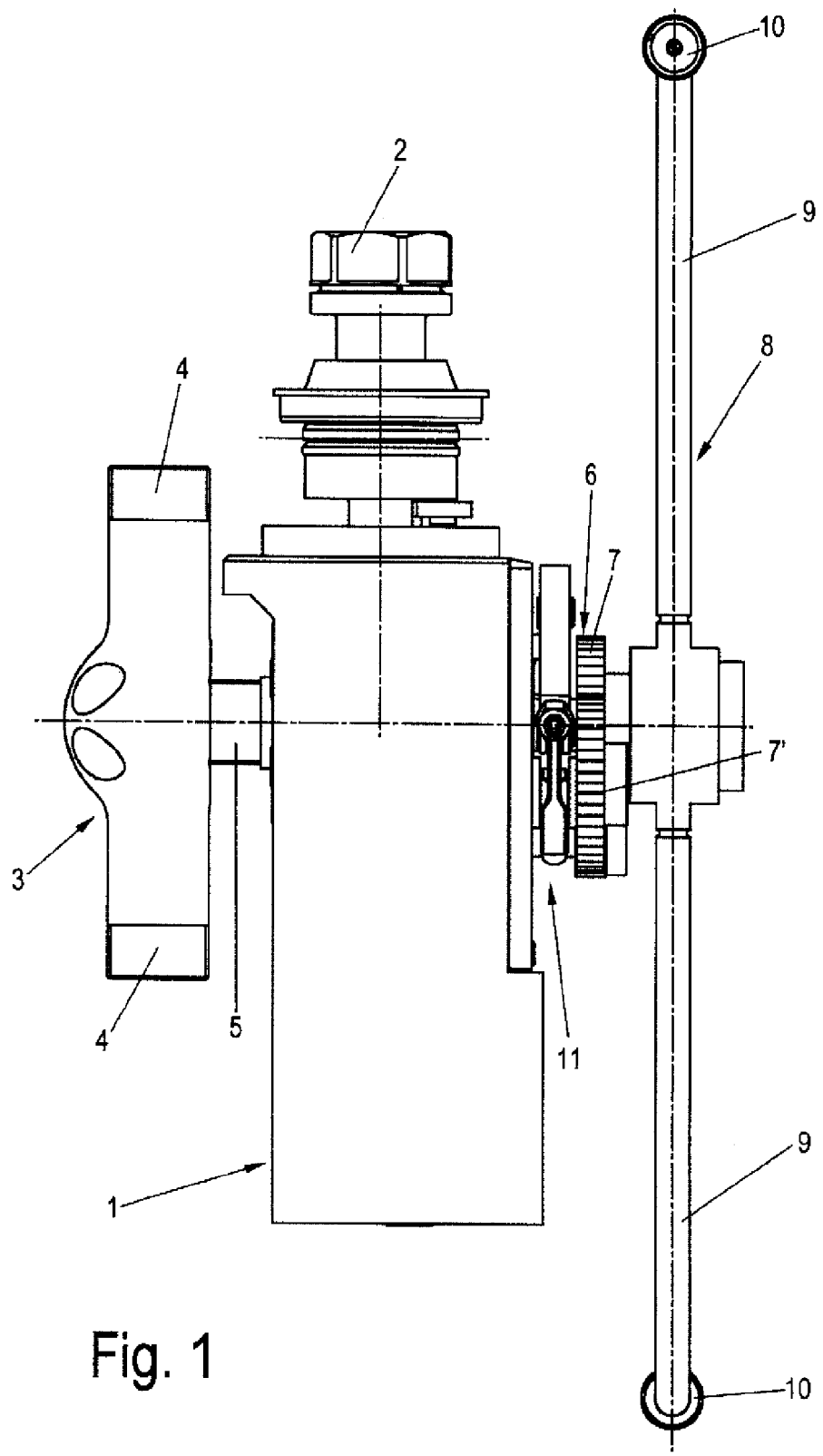
FIG. 1 is a side view of a cleaning device according to the present invention (without drive cover)
Figure 2:
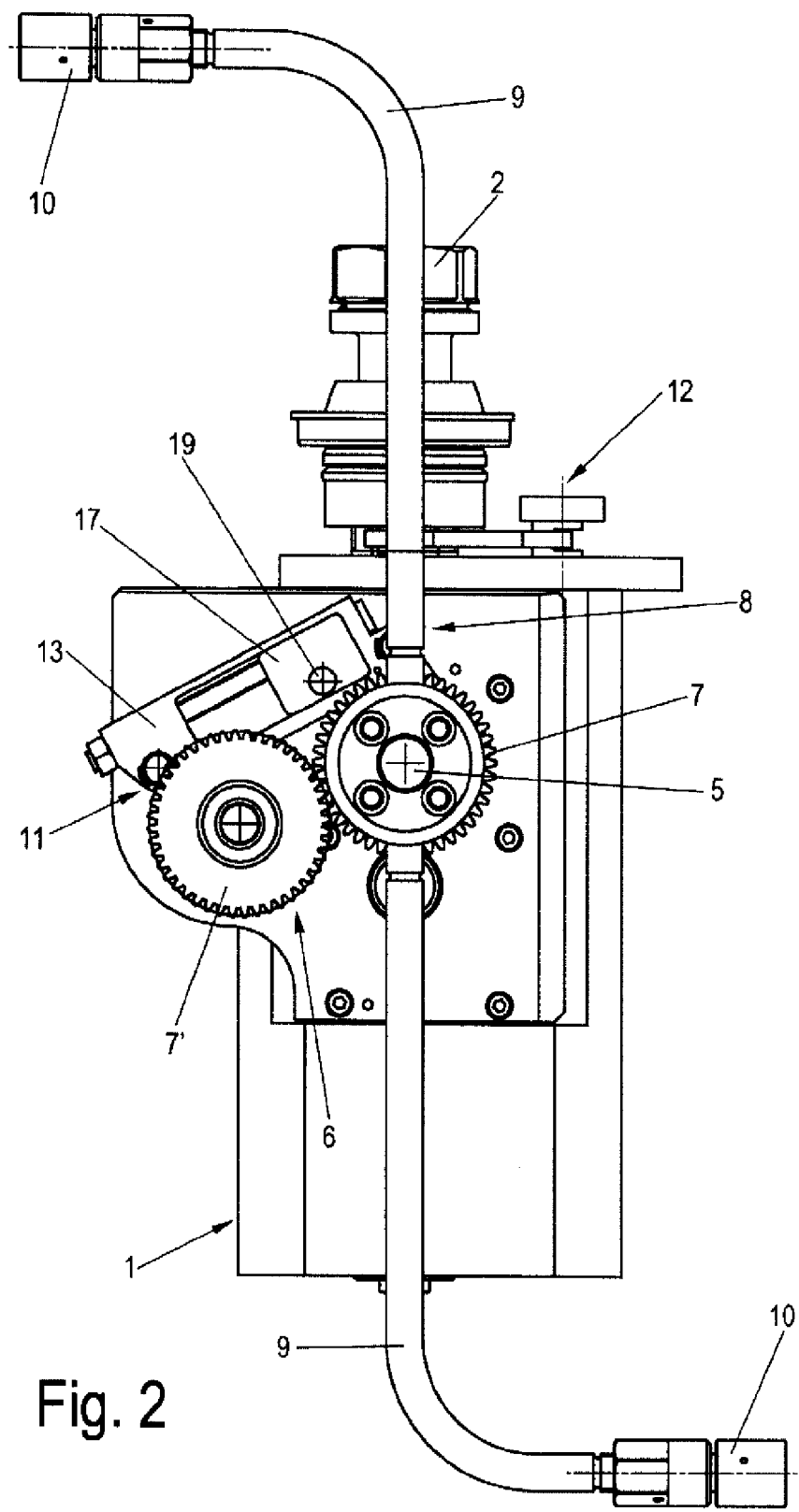
FIG. 2 is a front view of the cleaning device.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIGS. 1-5 illustrate a cleaning device for cleaning an interior space of a container which includes a liquid under pressure which in functional mode expels the liquid from at least one nozzle 4 held by an arm of a nozzle holder 3 attached to a rotatable motor shaft 5 supported in a rotating nozzle head 1 at an axis 20 perpendicular to the nozzle head, whereby the driveshaft 5 and the nozzle head 1 are reversibly pivotable via a gear mechanism.

Figure 10:
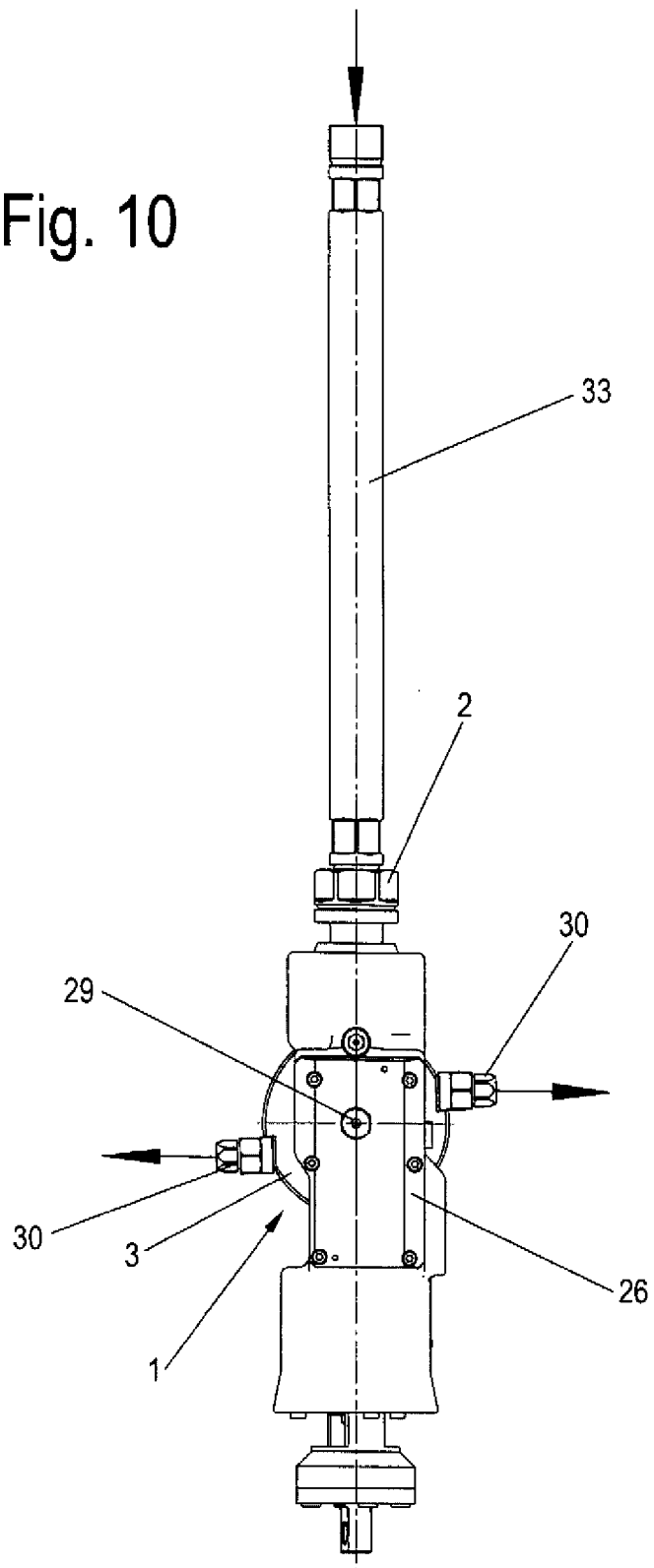
FIG. 10 is a front view of the cleaning device of FIG. 9.

Turning now in particular to FIG. 1, there is shown the nozzle holder 3 with two arms aligned relative to each other and each arm provided at the end with a nozzle 4. To drive the shaft 5, a hydraulic auxiliary drive 8 is arranged at the nozzle head 1 and disposed at the side facing away from the nozzle holder 3. The auxiliary drive 8 includes two drive arms 9, with each of the drive arms 9 holding a nozzle 10 in an angled position and facing in opposite direction for creating a recoil action. Liquid supplied via a supply line 33 (FIG. 10) and a liquid under pressure connection 2 drives the auxiliary drive 8 by means of the recoil action of the liquid under pressure expelled from the nozzles 10.

Transmission of the rotational motion of the auxiliary drive to the driveshaft 5 is realized by a gear mechanism 6 which includes two meshing gears 7, 7' whereby the action of the driven gear 7' rotates a crank disc 16 of the gear mechanism 11 with the crank disc 16 connected to a connecting rod 14. Connecting rod 14 is part of the gear mechanism 11 configured as a type of coupling drive and with which the driveshaft 5 is reversibly pivotable. One end of the connecting rod 14 connects a coupling member 13 to connect and transmit motion to a connecting rod 15, connected as a crank with the driveshaft 5.

In operation, the crank disc 16 fully rotates while the connecting rod 15, and thus the driveshaft 5 makes only a pivoting motion within the pivot angle α.

Figure 3:
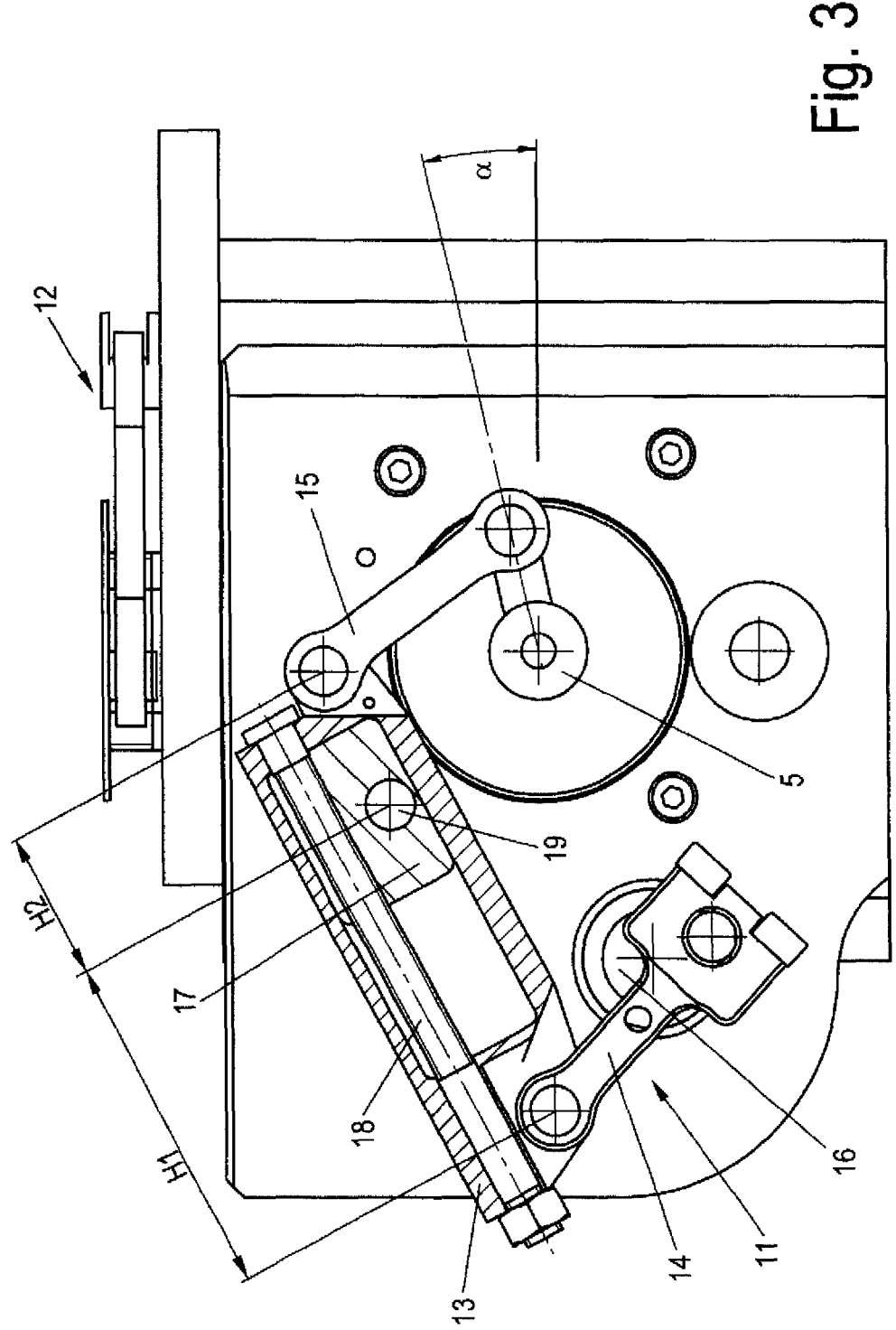
FIG. 3 is a partial section of a front view of the cleaning device in a functional position.
Figure 4:
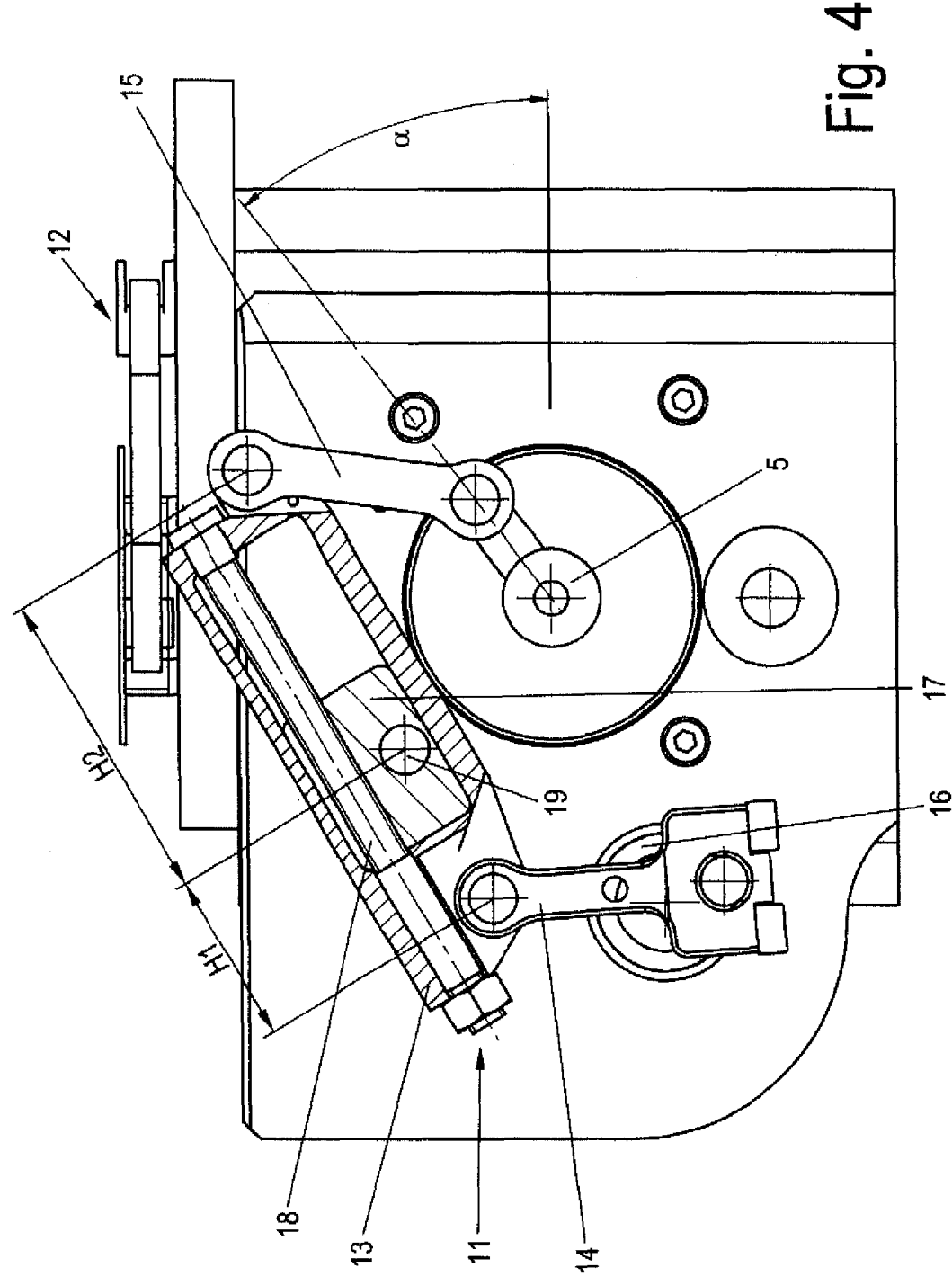
FIG. 4 is partial view according to FIG. 3 in a different functional position.
Figure 5:
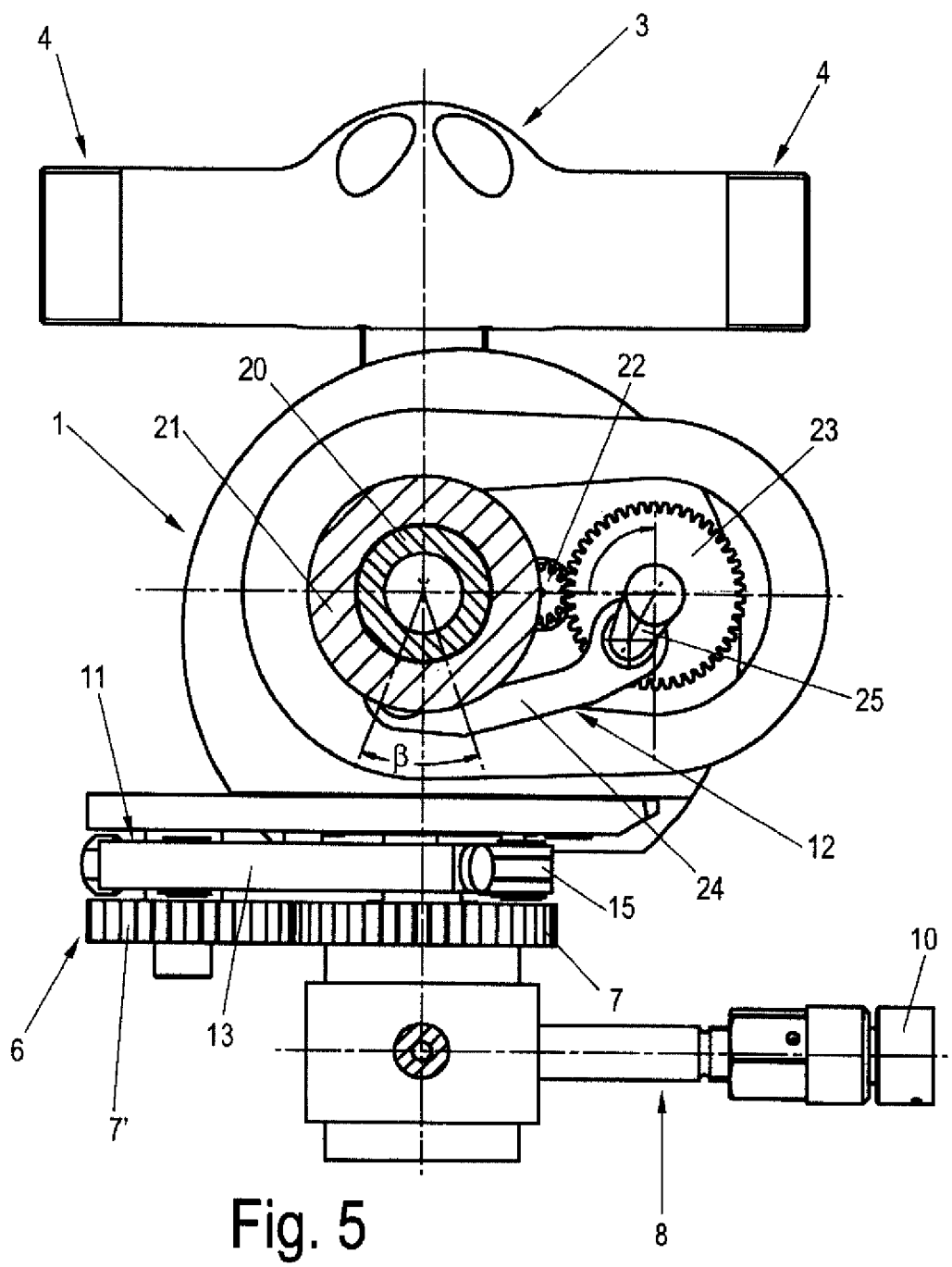
FIG. 5 is a section of a top view of the cleaning device.

FIGS. 3 and 4 each illustrate a different pivot angle α which is determined by an adjustable distance between the two linking points of connecting rods 14, 15 relative to a rotation pin 19 on which the coupling member 13, configured as a two armed lever, is pivoted.

In the example shown in FIG. 3, a distance H1 between the connecting point of connecting rod 14 at the coupling member 13 and the rotation pin 19, is greater than the distance H2 between the rotation pin 19 and the link point of connecting rod 15 and coupling member 13. In order to change the distances H1 and H2, a spindle drive is provided which includes a threaded spindle 18, the threaded area of which supports a spindle nut 17 and disposed in rotatable but stationary position at the rotation pin 19.

When the spindle rotates, the distances H1 and H2 change resulting in a pivot angle α of driveshaft 5 that may become greater or smaller. While FIG. 3 illustrates the smallest possible pivot angle α, where the spindle nut 17, in the direction of the connecting rod 15, is at an end position, FIG. 4 illustrates the maximal largest pivot angle α with the spindle nut 17 in the direction of the connecting rod 14 at an end position in the coupling member 13.

Coupling member 13 has a guide groove, in which the spindle nut 17 is guided in such a way that an easy displacement of the coupling member 13 is realized. If needed or desired, the nozzle head 1 is also reversibly pivotable. In that case, a further gear mechanism 12 is provided in an area of the nozzle head 1 facing the liquid under pressure connection 2, and is driven via two toothed gears 22, 23, where the driven toothed gear 23 similar to the function of the crank disc 16, is provided with a crank 21 which engages a coupling member 24 connected to a drive disc 21 such that it results in a movement around the pivot angle β. The driving toothed gear 22 is operatively connected to the auxiliary drive 8.

Figure 6A:
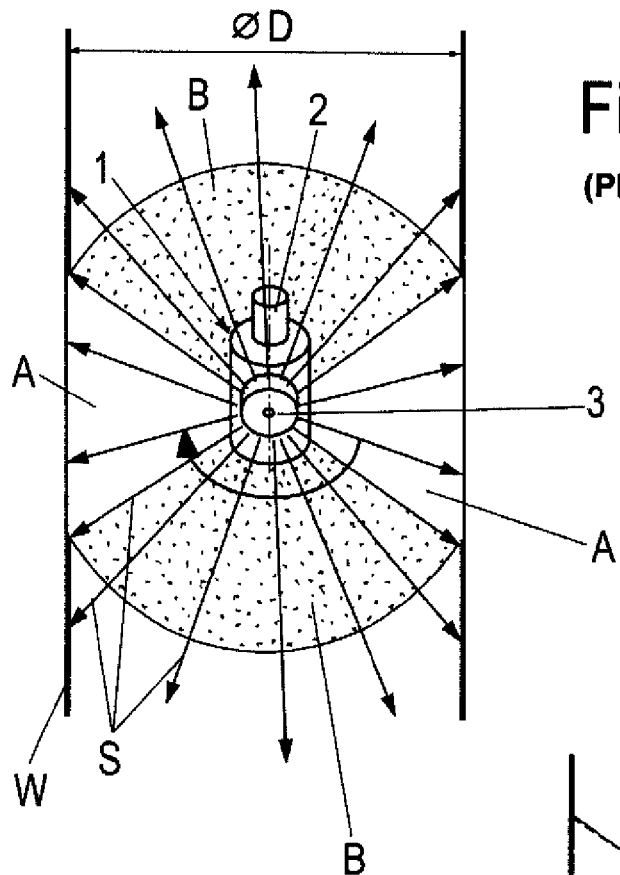
FIG. 6*a* is a schematic illustration of a jet expulsion of a prior art cleaning device.
Figure 6B:
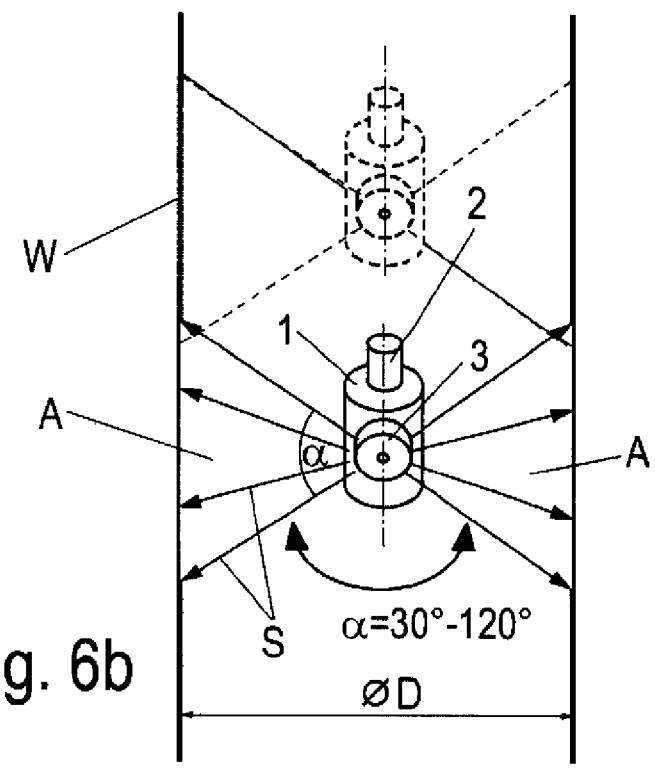
FIG. 6*b* is a schematic illustration of a jet expulsion of a cleaning device according to the present invention.
Figure 7A:
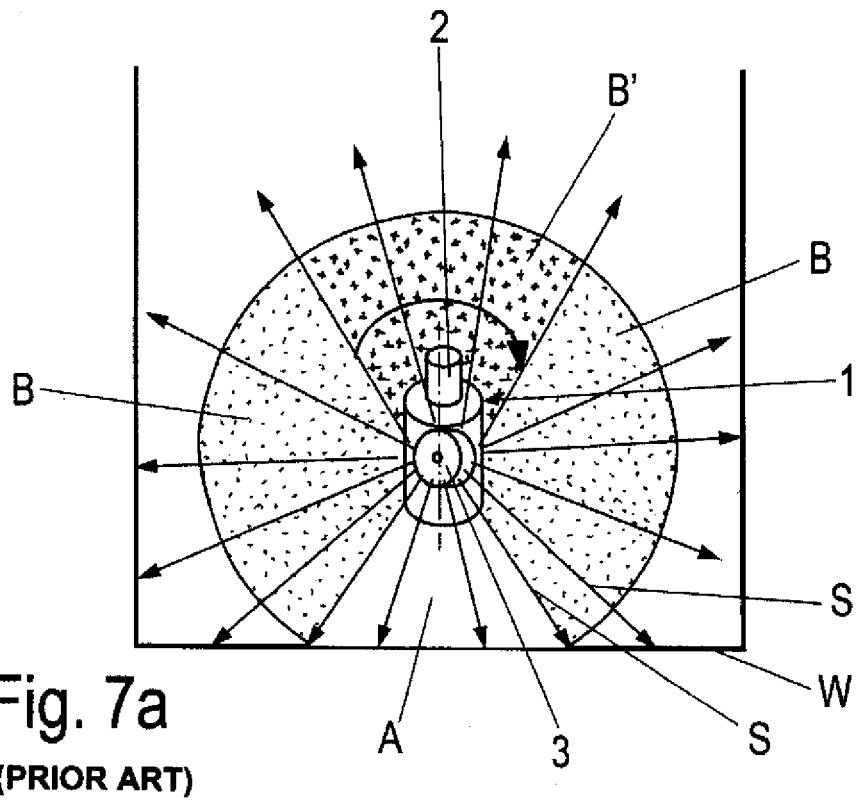
FIG. 7*a* is a schematic illustration of a cleaning effect attained by a prior art cleaning device with respect to a container floor.
Figure 7B:
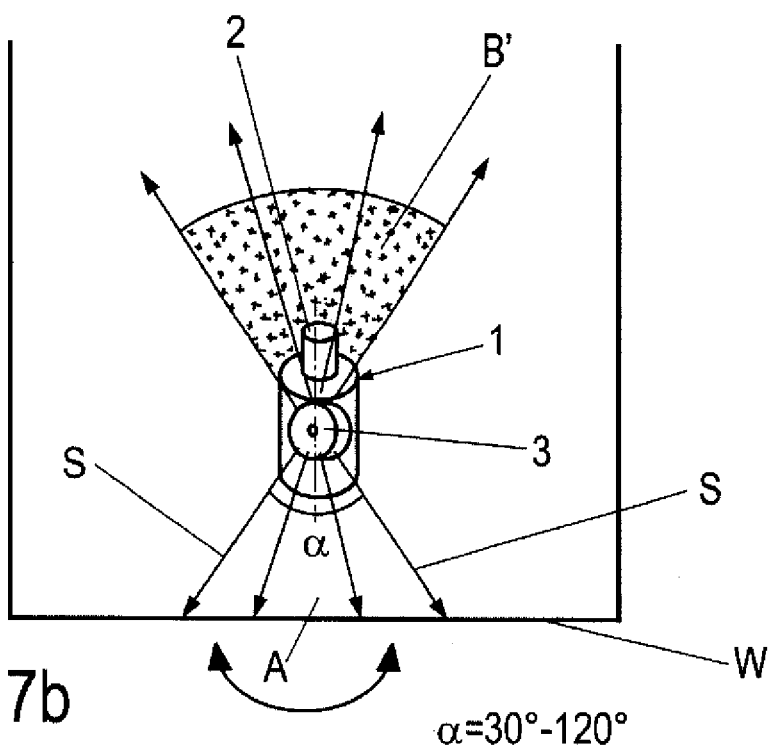
FIG. 7*b* is a schematic illustration of a cleaning effect attained by a cleaning device according to the present invention with respect to a container floor.
Figure 8A:
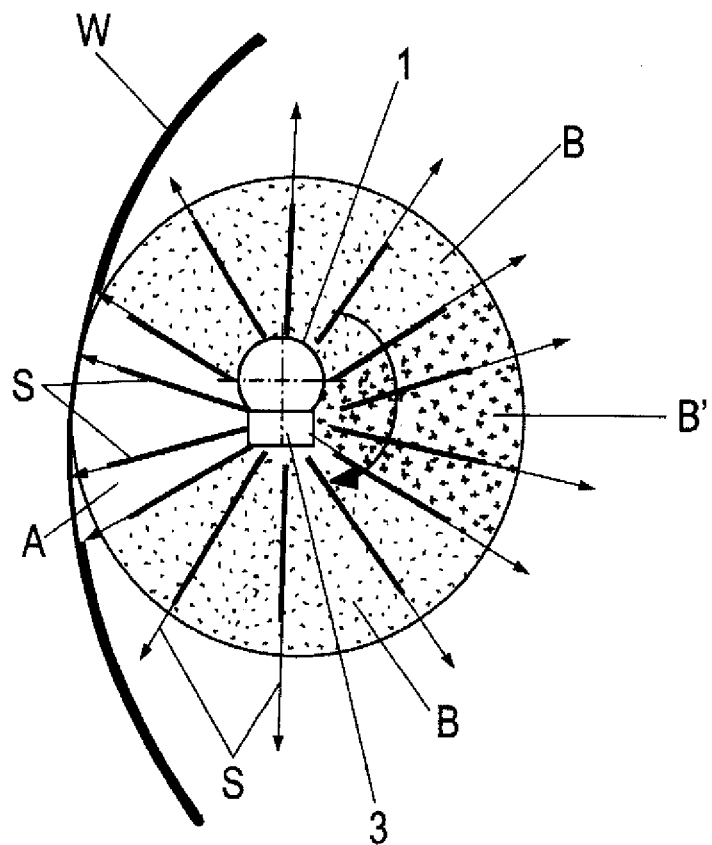
FIG. 8*a* is a schematic illustration of a cleaning effect attained by a prior art cleaning device with respect to a container wall.
Figure 8B:
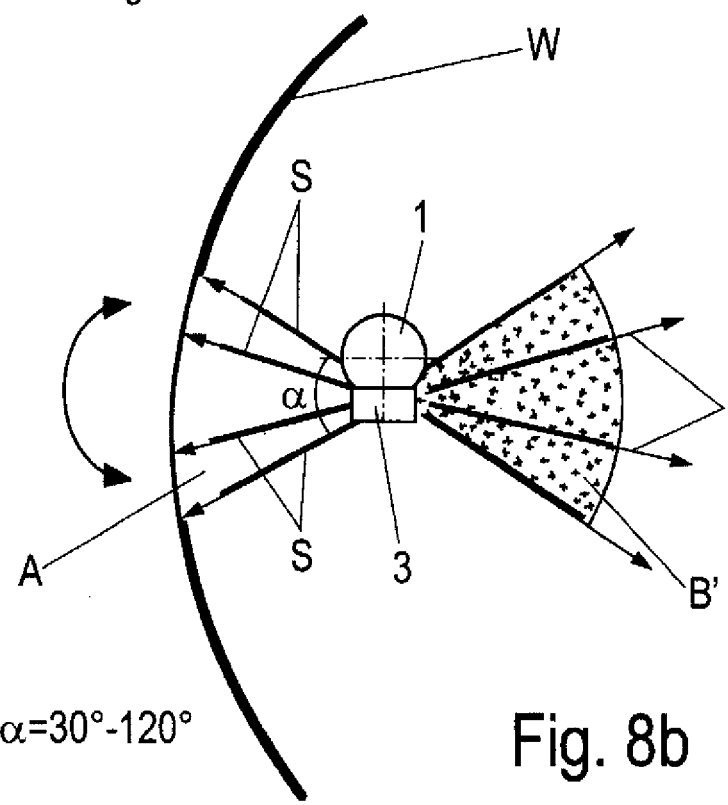
FIG. 8*b* is a schematic illustration of a cleaning effect attained by a cleaning device according to the present invention with respect to a container

In order to illustrate the increased efficiency of the cleaning device according to the present invention, various applications are schematically shown in FIGS. 6a, 6b, 7a, 7b, 8a, 8b, in which each of the FIGS. 6a, 7a, 8a is directed to the prior art and for comparison, FIGS. 6b, 7b, 8b show the application of the cleaning device of the present invention.

FIGS. 6a, 6b illustrate the cleaning of a surface 31 of interior wall W of a relatively small cylindrical container in which the cleaning device is at a central position relative to the diameter of the container. FIG. 6a shows that a cleaning device with a complete rotation of the nozzle arm impacts the deposits to be removed in a vertical plane of area A, while outside of this area, the pressurized cleaning liquid expelled at constant high pressure in the form of a jet S, carries out no leaning activity shown here by the surface B.

The increased cleaning efficiency realized by the cleaning device according to the present invention is specifically seen in FIG. 6b, where the nozzle holder 3 can be adjusted depending on the diameter of the container for a pivot angle of from 30°-120°.

As illustrated, the expelled water jets S are exclusively directed at the surfaces A where they serve removal of the deposits. This causes the nozzle head 1 to move, that is, it rotates completely around its axis.

FIGS. 7a, 7b illustrate the cleaning of surface 31 of the container floor in which the nozzle arm 3, according to the prior art (FIG. 7a), rotates 360° but cleans only the floor in the area of surface A. During this cleaning action, the water jets expelled from the opposite nozzles are thus not utilized, which is illustrated by surface B', with the surfaces B illustrating the lack of utilization of the two nozzles when a certain rotation position has been reached.

In comparison, as FIG. 7b shows, through the reversible motion of the nozzle 3 during cleaning, only the pressurized water expelled from the oppositely located nozzle in the area of surface B' remains unused.

A similar situation is illustrated in FIGS. 8a, 8b with respect to the cleaning of a wall W of a container, where according to the prior art (FIG. 8a), the rotation of nozzle head 1 causes a considerable portion of the pressurized water to remain unused so that during the cleaning process, the nozzle located opposite the spraying nozzle has no function. In the embodiment as shown in FIG. 8b, the nozzle head 1 and the nozzle holder 3 are both reversibly pivotable resulting in the example as illustrated where only the pressurized water in area B' remains unused.

Figure 9:
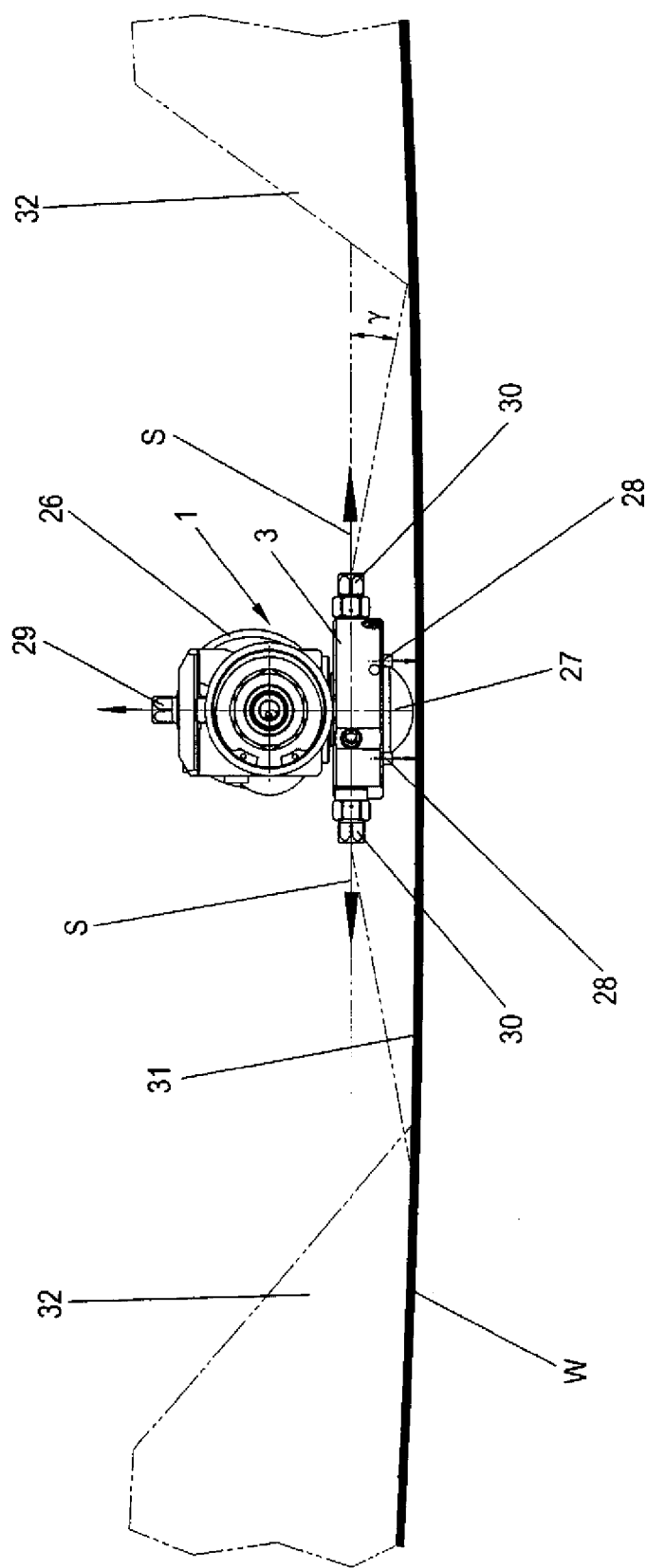
FIG. 9 is a schematic representation of the method carried out with the cleaning device according to the present invention.

FIG. 9 shows an application of the nozzle head 1, where through pressure, the nozzle head 1 is placed close to wall W which was previously cleaned. To prepare this surface for close alignment of a support body 27 of nozzle head 1 with the wall W, axial nozzles 28 are oriented perpendicular to the wall W that rotate together with the nozzle holder 3 disposed at the nozzle head 1, for removal of a deposit from the wall W. Also, radial nozzles 30 are provided laterally at the nozzle holder 3 and perpendicular to the axial nozzles 28. The radial nozzles 30 are pivotable at an angle γ for removing the deposits 32, whereby the liquid jet S expelled from the radial nozzles under pressure, normally water, strikes the deposit 32 from the side.

To produce the pressure force with which the nozzle head 1 is pressed against surface 31 of wall W, a recoil nozzle 29 is provided which is disposed in a housing 26 and which is fed by pressurized water supplied via a supply line 33. Nozzle head 1 is flexibly supported at the supply line 33 in order to realize an easy contact pressure at surface 31.

Figure 11:
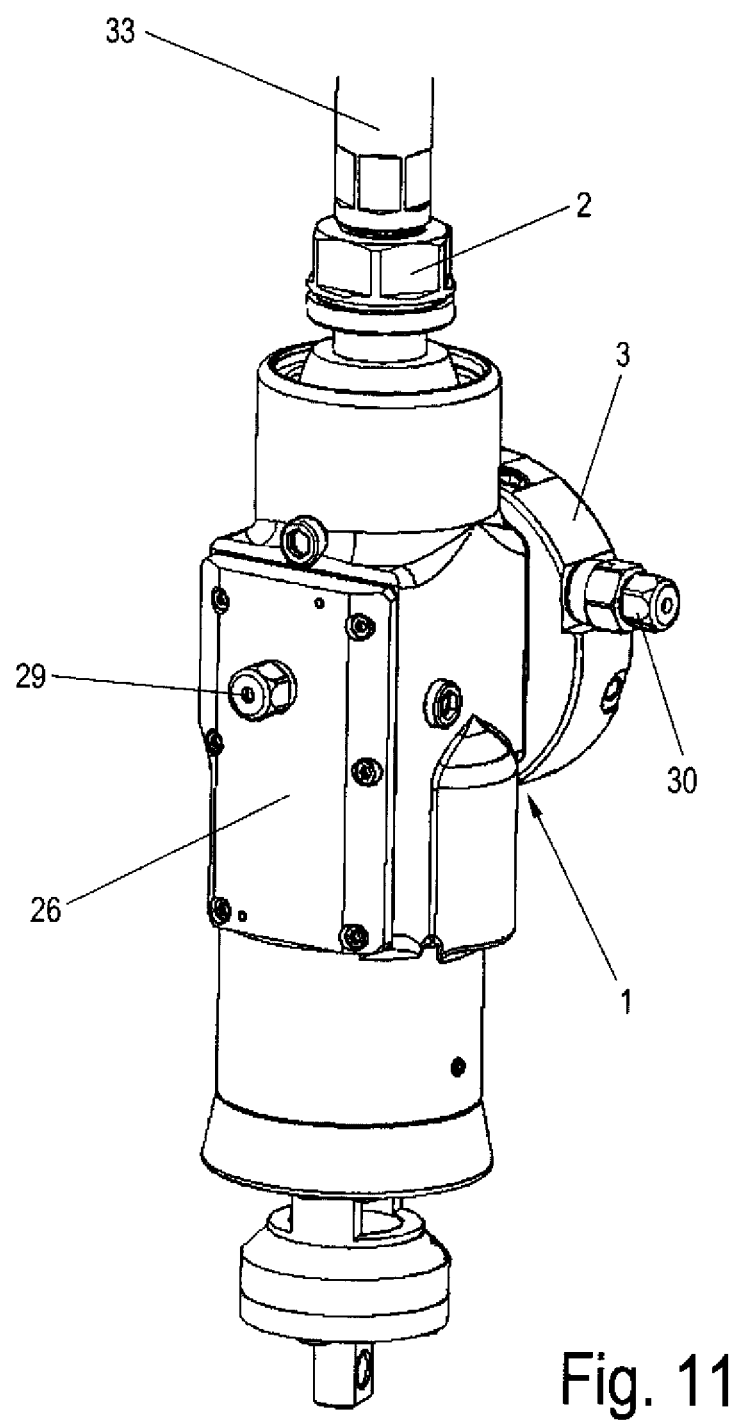
FIG. 11 is a perspective view of a cleaning device of FIGS. 9 and 10.

To obtain a contact point that is as small as possible for moving the cleaning device along surface 31, the support body 27 includes a hemispheric portion. The nozzle holder 3 is rotated in so far as the radial nozzles 30, with respect to the rotary bearing of the nozzle holder 3, are arranged set off to each other to produce a torque which causes the nozzle head 1 to rotate. The arrangement of the radial nozzles 30 is shown especially well in FIG. 11.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A cleaning device for cleaning an interior wall of a container, comprising:
   a rotatable driveshaft;
   a nozzle head supporting the driveshaft and mounted for rotation about an axis extending transversely to the driveshaft;
   a nozzle holder mounted on the driveshaft;
   at least one nozzle held in an arm of the nozzle holder for ejecting a liquid under pressure;
   a gear mechanism configured for reversibly pivoting at least one of the driveshaft and nozzle head; and
   a drive connected to the gear mechanism for driving the nozzle holder, wherein the gear mechanism is configured in at least one of two ways, a first way in which the gear mechanism is constructed as a coupling gear including a first connecting rod having one end connected to a driven crank disc and another end connected by an articulated joint to a coupling member to which a second connecting rod is connected, said second connecting rod being in operative connection with the driveshaft, and a second way in which the gear mechanism includes a gear driven by a toothed gear drive to which a crank is connected to a coupling gear attached at a drive disc.

2. The cleaning device of claim 1, wherein the crank disc is driven by the drive.

3. The cleaning device of claim 1, wherein the coupling member is constructed as a two-armed lever pivotably supported at on a rotating pin, said first and second connecting rods being spaced from the rotating pin at a distance which is variable.

4. The cleaning device of claim 3, wherein the rotating pin supports a spindle nut which is connected to a thread spindle of the coupling member, said thread spindle being configured for rotation in the coupling member.

5. The cleaning device of claim 1, wherein the nozzle holder includes two of said arm for holding nozzles in one-to-one correspondence, said nozzles being aligned and oriented in opposite direction.

6. The cleaning device of claim 1, wherein the drive is an electrically-operated, pneumatically-operated or hydraulically-operated drive.

7. A cleaning device for cleaning an interior wall of a container, comprising:
- a rotatable driveshaft;
- a nozzle head supporting the driveshaft and mounted for rotation about an axis extending transversely to the driveshaft;
- a nozzle holder mounted on the driveshaft;
- at least one nozzle held in an arm of the nozzle holder for ejecting a liquid under pressure;
- a gear mechanism configured for reversibly pivoting at least one of the driveshaft and nozzle head; and
- a drive connected to the gear mechanism for driving the nozzle holder,
- wherein the gear mechanism has a driven crank disc, said drive having at least two oppositely oriented recoil nozzles attached to angled drive arms and connected via a toothed gear with the crank disc and supplied with liquid under pressure.

8. The cleaning device of claim 7, wherein the nozzle holder includes two of said arm for holding nozzles in one-to-one correspondence, said nozzles being aligned and oriented in opposite direction.

9. The cleaning device of claim 7, wherein the drive is an electrically-operated, pneumatically-operated or hydraulically-operated drive.

* * * * *